(12) United States Patent
Lei et al.

(10) Patent No.: US 11,345,618 B2
(45) Date of Patent: May 31, 2022

(54) FULL-EFFECTIVE REVERSE OSMOSIS MEMBRANE ELEMENT AND WATER PURIFICATION MACHINE

(71) Applicant: Shenzhen Angel Drinking Water Industrial Group Corporation, Guangdong (CN)

(72) Inventors: Jing Lei, Guangdong (CN); Guoping Li, Guangdong (CN); Juan Wang, Guangdong (CN)

(73) Assignee: SHENZHEN ANGEL DRINKING WATER INDUSTRIAL GROUP CORPORATION, Guangdong (CN)

( * ) Notice: Subject to any disclaimer, the term of this patent is extended or adjusted under 35 U.S.C. 154(b) by 0 days.

(21) Appl. No.: 16/979,069

(22) PCT Filed: Oct. 15, 2018

(86) PCT No.: PCT/CN2018/110265
§ 371 (c)(1),
(2) Date: Sep. 8, 2020

(87) PCT Pub. No.: WO2019/223220
PCT Pub. Date: Nov. 28, 2019

(65) Prior Publication Data
US 2021/0061680 A1 Mar. 4, 2021

(30) Foreign Application Priority Data
May 22, 2018 (CN) .......................... 201820769503.9

(51) Int. Cl.
*C02F 1/44* (2006.01)
*C02F 1/00* (2006.01)

(52) U.S. Cl.
CPC ............. *C02F 1/441* (2013.01); *C02F 1/001* (2013.01); *B01D 2313/08* (2013.01); *C02F 2209/40* (2013.01)

(58) Field of Classification Search
CPC ............ B01D 2313/08; B01D 2313/10; B01D 2313/12; B01D 63/10–12; B01D 63/103;
(Continued)

(56) References Cited

U.S. PATENT DOCUMENTS

| 5,034,126 A | 7/1991 | Reddy et al. |
| 5,711,882 A | 1/1998 | Hofmann et al. |

(Continued)

FOREIGN PATENT DOCUMENTS

| CN | 202136922 U | 2/2012 |
| CN | 103446884 A | 12/2013 |
| CN | 104941448 A | 9/2015 |
| CN | 106110893 A | 11/2016 |
| CN | 107998894 A | 5/2018 |

(Continued)

OTHER PUBLICATIONS

Extended European Search Report dated Jun. 1, 2021 in EP Application No. 18919538.1.
(Continued)

*Primary Examiner* — Terry K Cecil
(74) *Attorney, Agent, or Firm* — Panitch Schwarze Belisario & Nadel LLP

(57) ABSTRACT

A full-effective reverse osmosis membrane element and a water purification machine are provided. The reverse osmosis membrane element includes a reverse osmosis membrane (20) and a central tube (10) provided with several water-inlet holes (11). The reverse osmosis membrane (20) is wound around the central tube (10) and covers each water-inlet hole (11) and forms a raw water flow channel. Two sides of the reverse osmosis membrane (20) are sealed by first and second water division bands (21) (22). The first water division band (21) and the central tube (10) form a first concentrated water-outlet (211). The first water division band (21) and the reverse osmosis membrane (20) form a second concentrated water-outlet (212). The second water division band (22) and the reverse osmosis membrane (20)

(Continued)

form a first raw water-inlet (221). The second water division band (22) and the central tube (10) form a second raw water-inlet (222).

10 Claims, 1 Drawing Sheet

(58) Field of Classification Search
CPC .. C02F 1/001; C02F 1/44; C02F 1/441; C02F 2209/40
USPC .................................................. 210/321.83
See application file for complete search history.

(56) References Cited

U.S. PATENT DOCUMENTS

| | | | |
|---|---|---|---|
| 2009/0139650 A1* | 6/2009 | Hardwicke | B01D 61/025 156/278 |
| 2014/0042080 A1 | 2/2014 | Hou et al. | |
| 2015/0251930 A1 | 9/2015 | Dufresne et al. | |

FOREIGN PATENT DOCUMENTS

| | | |
|---|---|---|
| JP | 2004033947 A | 2/2004 |
| WO | 2017115986 A1 | 7/2017 |

OTHER PUBLICATIONS

Int'l Search Report dated Feb. 20, 2019 in Int'l Application No. PCT/CN2018/110265.
Office Action dated Jan. 4, 2022 in JP Application No. 2021515258.

* cited by examiner

FULL-EFFECTIVE REVERSE OSMOSIS MEMBRANE ELEMENT AND WATER PURIFICATION MACHINE

CROSS-REFERENCE TO RELATED APPLICATIONS

This application is a Section 371 of International Application No. PCT/CN2018/110265, filed Oct. 15, 2018, which was published in the Chinese language on Nov. 28, 2019, under International Publication No. WO 2019/223220 A1, which claims priority under 35 U.S.C. § 119(b) to Chinese Application No. 201820769503.9, filed May 22, 2018, the disclosures of each of which are incorporated herein by reference in their entireties.

TECHNICAL FIELD

The present application relates to the technical field of water purification devices, in particular to a full-effective reverse osmosis membrane element and a water purification machine.

BACKGROUND

Reverse osmosis membranes as semipermeable membranes capable of effectively filtering out dissolved salts, colloids, microorganisms, and organic matters has been widely used in the field of water purification devices. Existing water purification elements provided with the reverse osmosis membranes typically comprise a water tube and a reverse osmosis membrane wounding around the water tube. During filtration, raw water inflows from one end of the water tube and osmoses to the reverse osmosis membrane from the water tube to be filtered.

However, the raw water flows in the direction of the central axis of the water tube and permeate to the reverse osmosis membrane, as a result, the raw water makes contact with the reverse osmosis membrane for a short time; and concentrated water generated after the raw water is filtered is prone to causing concentration polarization on the surface of the reverse osmosis membrane, resulting in scaling on the surface of the reverse osmosis membrane. Consequentially, the water purification elements provided with the reverse osmosis membranes have a short use life.

SUMMARY

Technical Issues

The objective of the embodiment of the present application is to provide a full-effective reverse osmosis membrane element and a water purification machine to solve the technical problem that a water purification element, provided with a reverse osmosis membrane, in the prior art has a short use life due to the surface of the reverse osmosis membrane is easily to be scaled.

The objective of the embodiment of the present application is to further provide a water purification machine to solve the technical problem that a water purification machine in the prior art has poor stability after long-term use.

Solution to the Issues

Technical Solution

The technical solution adopted by the invention to settle the above-mentioned technical issue is as follows:

An embodiment of the present application provides a full-effective reverse osmosis membrane element comprising a central tube and a reverse osmosis membrane, a hole-wall of the central tube being provided with a plurality of water-inlet holes, each of the water-inlet holes being distributed in a length direction of the central tube, the reverse osmosis membrane being folded in half to wound around the central tube and covering the water-inlet holes, two ends, away from the central tube, of the reverse osmosis membrane folded in half being attached together hermetically, a raw water flow channel being formed between front surfaces of the reverse osmosis membrane folded in half, and two opposite edges, adjacent to the central tube, of the reverse osmosis membrane folded in half being respectively sealed by a first water division band and a second water division band, a first end of the first water division band and a first end of the central tube being spaced from each other and forming a first concentrated water-outlet, a second end of the first water division band and an end, away from the central tube, of the reverse osmosis membrane being spaced from each other and forming a second concentrated water-outlet, a first end of the second water division band and the end, away from the central tube, of the reverse osmosis membrane being spaced from each other and forming a first raw water-inlet; and the first concentrated water-outlet, the second concentrated water-outlet, and the first raw water-inlet communicating with the raw water flow channel.

Preferably, a second end of the second water division band and a second end of the central tube are spaced from each other and form a second raw water-inlet communicated with the raw water flow channel.

Preferably, a purified water flow channel is formed between back surfaces of the reverse osmosis membrane folded in half and is communicated with the water-inlet holes.

Preferably, a distance between the first water division band and the central tube is greater than that between the second water division band and the central tube.

Preferably, a distance between the first water division band and the end, away from the central tube, of the reverse osmosis membrane is less than that between the second water division band and the end, away from the central tube, of the reverse osmosis membrane.

Preferably, the first water division band and the second water division band are waterproof adhesive tapes.

Preferably, an inflow water guide net used to guide the raw water to flow is arranged in the raw water flow channel and has two opposite edges respectively connected to the first water division band and the second water division band.

Preferably, a purified water guide net used to guide the purified water to flow is arranged in the purified water flow channel.

Preferably, the reverse osmosis membrane is rectangular when unfolded, the first water division band and the second water division band respectively seal two longer sides of the reverse osmosis membrane, a short side of the reverse osmosis membrane is attached to the external wall of the central tube, and two opposite edges of the purified water guide net are respectively connected to the longer sides of the reverse osmosis membrane.

Preferably, an external hole perimeter of the first concentrated water-outlet accounts for 10%-50% of a length of a longer side of the reverse osmosis membrane.

Preferably, an external hole perimeter of the first concentrated water-outlet accounts for 15%-40% of a length of a longer side of the reverse osmosis membrane.

Preferably, an external hole perimeter of the second concentrated water-outlet accounts for 0.1%-5% of a length of a longer side of the reverse osmosis membrane.

Preferably, an external hole perimeter of the second concentrated water-outlet accounts for 0.5%-3.0% of a length of a longer side of the reverse osmosis membrane.

Preferably, an external hole perimeter of the first raw water-inlet accounts for 10%-50% of a length of a longer side of the reverse osmosis membrane.

The embodiment of the present application further provides a water purification machine comprising the above full-effective reverse osmosis membrane element.

The present application has the following beneficial effects:

Compared with the prior art, when the full-effective reverse osmosis membrane element provided in the embodiment of the present application filters raw water, a large amount of raw water flows into the raw water flow channel between the front surfaces of the reverse osmosis membrane via the first raw water-inlet; during flowing in the raw water flow channel, the raw water can be filtered by the reverse osmosis membrane; purified water generated after the raw water is filtered flows into the central tube via the water-inlet holes and then flows out of the central tube; and raw water which does not pass through the reverse osmosis membrane outflows via the first concentrated water-outlet. Because the second end of the first water division band and the end, away from the central tube, of the reverse osmosis membrane are spaced from each other and form the second concentrated water-outlet, concentrated water generated after the raw water is filtered outflows via the second concentrated water-outlet, thus the flow rate of the concentrated water is obviously enhanced, the raw water is accelerated to flow, and the concentrated water is prevented from being accumulated to avoid a stagnant dead space in the reverse osmosis membrane, so that scaling caused by accumulation of the concentrated water on the reverse osmosis membrane away from the central tube is relieved, and the use life of the reverse osmosis membrane is prolonged.

The water purification machine in the embodiment of the present application has the following beneficial effects: the water purification machine uses the above full-effective reverse osmosis membrane element, so that concentrated water can efficiently flow out of the full-effective reverse osmosis membrane element via double concentrated water-outlets and double raw water-inlets in the full-effective reverse osmosis membrane element, a flow "dead space" of the raw water is avoided, and the surface of the reverse osmosis membrane is not prone to scaling, thus preventing the reverse osmosis membrane from being replaced or cleaned frequently, prolonging the use life of the reverse osmosis membrane, and guaranteeing the stability of the water purification machine after long-term use.

REFERENCE SIGNS 10, central tube; 11, water-inlet hole; 20, reverse osmosis membrane;

21, first water division band, 22, second water division band; 221, first raw water-inlet;

222, second raw water-inlet; 211, first concentrated water-outlet;

212; second concentrated water-outlet.

DETAILED DESCRIPTION OF EMBODIMENTS

Figure 1:
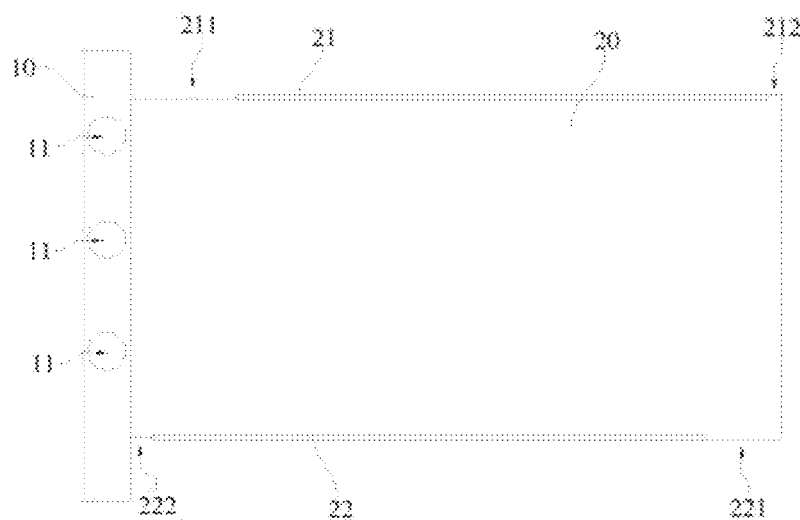
FIG. 1 is a structural diagram of a full-effective reverse osmosis membrane element in an embodiment of the present application.
Figure 2:
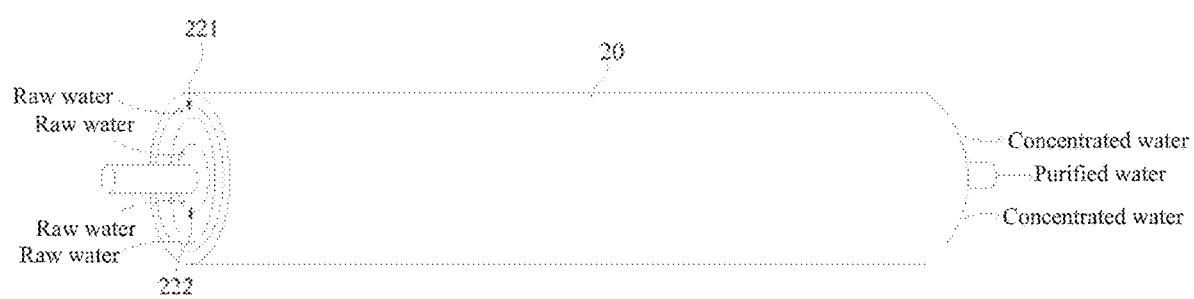
FIG. 2 is another structural diagram of the full-effective reverse osmosis membrane element in the embodiment of the present application.

The embodiments of the present application are expounded below and illustrated in the accompanying drawings. Wherein, the same or similar reference signs represent the same or similar elements or elements having the same or similar functions throughout. The following embodiments described with reference to FIGS. 1-2 are illustrative ones, are intended to explain the present application, and should not be understood as limitations of the present application.

It should be understood that the directional or positional relations indicated by terms such as "length", "width", "upper", "lower", "front", "back", "left", "right", "vertical", "horizontal", "top", "bottom", "internal", and "external" are based on directional or positional relations shown in the accompanying drawings, these terms are only used to facilitate and simplify the description of the present application, and do not indicate or imply that devices or elements referred to must have specific directions or must be formed and operated in specific directions, and these terms should not to be understood as limitations of the present application.

Furthermore, terms such as "first" and "second" are only for the purpose of description, and are not used to indicate or hint relative importance or to implicitly indicate the number of the technical features indicated. Thus, the features defined by "first" and "second" may explicitly or implicitly include one or more of the features. Unless otherwise explicitly and particularly defined, "a plurality of" in the description of the present application means at least two or more.

Unless otherwise explicitly specified and defined, the terms such as "install", "fix", "connected", and "connect" should be understood broadly in the present application. For instance, "connect" can be interpreted as fixed connection, detachable connection, integral connection, mechanical connection or electrical connection and can also be interpreted as direct connection, indirect connection through a medium, or internal communication or interaction of two components. Those ordinarily skilled in the art can understand the specific meanings of these terms in the present application as the case may be.

As shown in FIG. 1-2, an embodiment of the present application provides a full-effective reverse osmosis membrane element comprising a central tube 10 and a reverse osmosis membrane 20, wherein a plurality of water-inlet holes 11 are formed in the hole-wall of the central tube 10 and are distributed in the length direction of the central tube 10. The reverse osmosis membrane 20 is folded in half to wound around the central tube 10 and cover the water-inlet holes 11. Two ends, away from the central tube 10, of the reverse osmosis membrane 20 folded in half are attached hermetically. A raw water flow channel (not shown in the figures) is formed between front surfaces of the reverse osmosis membrane 20 folded in half. And two opposite edges, adjacent to the central tube 10, of the reverse osmosis membrane 20 folded in half are respectively sealed by a first water division band 21 and a second water division band 22. A first end of the first water division band 21 and a first end of the central tube 10 are spaced from each other and form a first concentrated water-outlet 211, a second end of the first water division band 21 and an end, away from the central tube 10, of the reverse osmosis membrane 20 are spaced from each other and form a second concentrated water-outlet 212, and a first end of the second water division band 22 and the end, away from the central tube 10, of the reverse osmosis membrane 20 are spaced from each other and form a first raw water-inlet 221. The first concentrated water-outlet 211, the second concentrated water-outlet 212, and the first raw water-inlet 221 are communicated with the raw water flow channel.

When the full-effective reverse osmosis membrane element in the embodiment of the present application filters raw water, a large amount of raw water can flow into the raw water flow channel between the front surfaces of the reverse osmosis membrane via the first raw water-inlet 221; during flowing in the raw water flow channel, the raw water can be filtered by the reverse osmosis membrane 20; purified water generated after the raw water is filtered flows into the central tube 10 via the water-inlet holes 11 and then flows out of the central tube 10; and raw water which does not pass through the reverse osmosis membrane 20 outflows via the first concentrated water-outlet 211. Because the second end of the first water division band 21 and the end, away from the central tube 10, of the reverse osmosis membrane 20 are spaced from each other and form the second concentrated water-outlet 212, concentrated water generated after the raw water is filtered outflows via the second concentrated water-outlet 212, thus the flow rate of the concentrated water is obviously enhanced, and the concentrated water is prevented from being accumulated to avoid a dead space in the reverse osmosis membrane 20, so that scaling caused by accumulation of the concentrated water on the reverse osmosis membrane 20 away from the central tube 10 is relieved, and the use life of the reverse osmosis membrane 20 is prolonged. Of course, the positions of the first concentrated water-outlet 211 and the second concentrated water-outlet 212 can be exchanged as actually needed, and similarly, the flow rate of the concentrated water can be enhanced, and the concentrated water can be prevented from being accumulated to avoid the dead space in the reverse osmosis membrane 20.

In this embodiment, as shown in FIG. 1-2, an end of the second water division band 22 and a second end of the central tube 10 are spaced from each other and form a second raw water-inlet 222 communicated with the raw water flow channel. Particularly, because the second raw water-inlet 222 is formed close to the second end of the central tube 10, part of raw water flows into the raw water flow channel via the second raw water-inlet 222 in an axial direction of the central tube 10, thus the raw water is prevented from forming a dead space in the raw water flow channel, and the raw water flow channel is equivalent to being lengthened, and raw water can be supplemented in a corner, showing poor flow rate of the raw water and close to the central tube 10, of the raw water flow channel to enhance the flow rate of the raw water at the corner, so that the scaling at the dead space in the raw water flow channel is obviously relieved. Accordingly, the raw water enters the raw water flow channel via the first raw water-inlet 221 and the second raw water-inlet 222 to form turbulent flows in the raw water flow channel on the whole, thus the flow rate of the raw water is increased, and the raw water is prevented from being retained on a polarization boundary layer at a contact position of the reverse osmosis membrane 20 and the raw water, so that the raw water at a high flow rate can effectively scour scales on the surface of the reverse osmosis membrane 20 to further prolong the use life of the reverse osmosis membrane 20. Of course, the positions of the first raw water-inlet 221 and the second raw water-inlet 222 can be exchanged as actually needed, and similarly, the flow rate of the raw water can be enhanced, and the scaling at the dead space in the raw water flow channel can be obviously relieved.

In this embodiment, as shown in FIG. 1-2, a purified water flow channel (not shown in the figures) is formed between back surfaces of the reverse osmosis membrane 20 folded in half and is communicated with the water-inlet holes 11. Particularly, the purified water flow channel is formed between the back surfaces of the reverse osmosis membrane 20 folded in half and is communicated with the water-inlet holes 11, so that the raw water can be filtered by the reverse osmosis membrane 20 when flowing in the raw water flow channel and then enter the purified water flow channel. The purified water flow channel is communicated with the water-inlet holes 11, thus purified water can enter the central tube 10 via the purified water flow channel and the water-inlet holes 11 and then flow out of the central tube 10 to enter an external water supply device.

Further, as shown in FIG. 1-2, the distance between the first water division band 21 and the central tube 10 is greater than that between the second water division band 22 and the central tube 10, the distance between the first water division band 21 and the end, away from the central tube 10, of the reverse osmosis membrane 20 is less than that between the second water division band 22 and the end, away from the central tube 10, of the reverse osmosis membrane 20. Because the distance between the first water division band 21 and the central tube 10 is greater than that between the second water division band 22 and the central tube 10, an external hole aperture of the first concentrated water-outlet 211 formed after the first water division band 21 is wound around the central tube 10 is greater than that of the second raw water-inlet 222 formed after the second water division band 22 is wound around the central tube 10, so that concentrated water generated after filtration is completed can smoothly flow out of the reverse osmosis membrane 20 element.

Further, as shown in FIG. 1-2, waterproof adhesive tapes are used as the first water division band 21 and the second water division band 22. Particularly, the first water division band 21 and the second water division band 22 formed by the waterproof adhesive tapes have good waterproof properties and adhesive properties, thus separating the raw water and steadily sealing the two opposite edges, adjacent to the central tube 10, of the reverse osmosis membrane 20.

In this embodiment, as shown in FIG. 1-2, an inflow water guide net (not shown in the figures) used to guide the raw water to flow is arranged in the raw water flow channel and has two opposite edges respectively connected to the first water division band 21 and the second water division band 22. Particularly, because the inflow water guide net is configured and the two opposite edges of the inflow water guide net are respectively connected to the first water division band 21 and the second water division band 22, the raw water entering the raw water flow channel can be guided by the inflow water guide net; and because of the net structure of the inflow water guide net, the raw water can be guided by the inflow water guide net to better contact with the reverse osmosis membrane 20 when flowing in the raw water flow channel, so that more raw water can be filtered by the reverse osmosis membrane 20 to be transformed into the purified water.

In this embodiment, as shown in FIG. 1-2, a purified water guide net (not shown in the figures) used to guide the purified water to flow is arranged in the purified water flow channel. Particularly, because the purified water guide net is configured, the purified water in the purified water flow channel can be guided by the purified water guide net to flow in the purified water flow channel more smoothly.

In this embodiment, as shown in FIG. 1-2, the reverse osmosis membrane 20 is rectangular when unfolded, the first water division band 21 and the second water division band 22 respectively seal two longer sides of the reverse osmosis membrane 20, one short side of the reverse osmosis membrane 20 is attached to the external wall of the central tube 10, and two opposite edges of the purified water guide net are respectively connected to the longer sides of the reverse osmosis membrane 20. Particularly, the reverse osmosis membrane 20 is rectangular when unfolded, and the first water division band 21 and the second water division band 22 respectively seal two longer sides of the reverse osmosis membrane 20, such that, the raw water flow channel is equivalent to being lengthened as much as possible, the raw water makes contact with the reverse osmosis membrane 20 as much as possible when flowing in the raw water flow channel, and thus more raw water can be transformed into the purified water.

In this embodiment, the external hole perimeter of the first concentrated water-outlet 211 accounts for 10%-50% of the length of the longer sides of the reverse osmosis membrane 20. Particularly, the external hole perimeter of the first concentrated water-outlet 211 may account for 10%, 15%, 20%, 25%, 30%, 35%, 40%, 45%, or 50% of the length of the longer sides of the reverse osmosis membrane 20. The external hole perimeter of the first concentrated water-outlet 211 is limited to account for 10%-50% of the length of the longer sides of the reverse osmosis membrane 20, thus the first concentrated water-outlet 211 is more accurate in size, so that the concentrated water can efficiently outflow via the first concentrated water-outlet 211, the first concentrated water-outlet 211 is limited in size to be prevented from being extremely large, which may otherwise make the raw water outflow via the first concentrated water-outlet 211 without being filtered sufficiently, and the transformation rate of the raw water into the purified water is guaranteed.

In this embodiment, the external hole perimeter of the second concentrated water-outlet 212 accounts for 0.1%-5% of the length of the longer sides of the reverse osmosis membrane 20. Particularly, the an external hole perimeter of the second concentrated water-outlet 212 may account for 0.1%, 0.5%, 1.0%, 1.5%, 2.0%, 2.5%, 3.0%, 3.5%, 4.0%, 4.5%, or 5.0% of the length of the longer sides of the reverse osmosis membrane 20. Thus the second concentrated water-outlet 212 serving as an auxiliary water-outlet opening is large enough, so that outflow efficiency of the concentrated water is effectively improved.

In this embodiment, the external hole perimeter of the first raw water-inlet 221 accounts for 10%-50% of the length of the longer sides of the reverse osmosis membrane 20. Particularly, the external hole perimeter of the first raw water-inlet 221 may account for 10%, 15%, 20%, 25%, 30%, 35%, 40%, 45%, or 50% of the length of the longer sides of the reverse osmosis membrane 20. The external hole perimeter of the first raw water-inlet 221 is limited to account for 10%-50% of the length of the longer sides of the reverse osmosis membrane 20, thus sufficient raw water flows into the raw water flow channel via the first raw water-inlet 221, so that the flow rate of the raw water in the raw water flow channel is guaranteed.

The embodiment of the present application further provides a water purification machine comprising the above full-effective reverse osmosis membrane element.

The water purification machine in the embodiment of the present application uses the above full-effective reverse osmosis membrane element, so that concentrated water can efficiently flow out of the full-effective reverse osmosis membrane element via double concentrated water-outlets and double raw water-inlets in the full-effective reverse osmosis membrane element, a flow "dead space" of the raw water is avoided, and the surface of the reverse osmosis membrane 20 is not prone to scaling, thus preventing the reverse osmosis membrane 20 from being replaced or cleaned frequently, prolonging the use life of the reverse osmosis membrane 20, and guaranteeing the stability of the water purification machine after long-term use.

In summary, the present application has the above excellent properties, thus improving the efficiency which cannot be achieved in the prior art to have practicability in use. Accordingly, the product incorporating the present application has great practical value.

The above embodiments are only preferred ones of the present application, and are not intended to limit the present application. Any modifications, equivalent substitutes or improvements achieved based on the conception and principle of the present application should also fall within the protection scope of the present application.

What is claimed is:

1. A full-effective reverse osmosis membrane element comprising a central tube and a reverse osmosis membrane folded in half to be wound around the central tube, a raw water flow channel being formed between front surfaces of the reverse osmosis membrane folded in half, two opposite edges on each lateral side of the reverse osmosis membrane folded in half being respectively sealed by a first water division band and a second water division band, a first end of the first water division band and a first end of the central tube being spaced from each other and forming a first concentrated water-outlet, a second end of the first water division band and an end, away from the central tube, of the reverse osmosis membrane being spaced from each other and forming a second concentrated water-outlet, a first end of the second water division band and the end, away from the central tube, of the reverse osmosis membrane being spaced from each other and forming a first raw water-inlet, and a second end of the second water division band and a second end of the central tube being spaced from each other and forming a second raw water-inlet, wherein an external hole perimeter of the first concentrated water-outlet accounts for 10%-50% of a length of a longer side of the reverse osmosis membrane, and an external hole perimeter of the first raw water-inlet accounts for 10%-50% of the length of the longer side of the reverse osmosis membrane, such that dead spaces are prevented from being formed in the raw water flow channel.

2. The full-effective reverse osmosis membrane element of claim 1, wherein the first concentrated water-outlet, the second concentrated water-outlet, and the first raw water-inlet are communicated with the raw water flow channel.

3. The full-effective reverse osmosis membrane element of claim 1, wherein the second raw water-inlet is communicated with the raw water flow channel.

4. The full-effective reverse osmosis membrane element of claim 1, wherein a distance between the first water division band and the central tube is greater than that between the second water division band and the central tube.

5. The full-effective reverse osmosis membrane element of claim 1, wherein a distance between the first water division band and the end, away from the central tube, of the reverse osmosis membrane is less than that between the second water division band and the end, away from the central tube, of the reverse osmosis membrane.

6. The full-effective reverse osmosis membrane element of claim 1, wherein the reverse osmosis membrane is rectangular when unfolded, the first water division band and the second water division band respectively seal two longer sides of the reverse osmosis membrane, a short side of the reverse osmosis membrane is attached to the external wall of the central tube.

7. A water purification machine, comprising the full-effective reverse osmosis membrane element of claim 1.

8. A full-effective reverse osmosis membrane element comprising a central tube and a reverse osmosis membrane folded in half to be wound around the central tube, a raw water flow channel being formed between front surfaces of the reverse osmosis membrane folded in half, two opposite edges on each lateral side of the reverse osmosis membrane folded in half are respectively sealed by a first water division band and a second water division band, a first end of the first water division band and a first end of the central tube being spaced from each other and forming a first concentrated water-outlet, a second end of the first water division band and an end of the reverse osmosis membrane away from the central tube being spaced from each other and forming a second concentrated water-outlet, a first end of the second water division band and the end of the reverse osmosis membrane away from the central tube being spaced from each other and forming a second raw water-inlet, and a second end of the second water division band and a second end of the central tube being spaced from each other and forming a first raw water-inlet, wherein dead spaces are prevented from being formed in the raw water flow channel.

9. A reverse osmosis membrane assembly comprising a central tube and a reverse osmosing membrane folded in half, wherein two opposite edges on each lateral side of the reverse osmosis membrane folded in half are respectively sealed by a first water division band and a second water division band, a first end of the first water division band and a first end of the central tube are spaced from each other and form a first concentrated water-outlet, a second end of the first water division band and an end, away from the central tube, of the reverse osmosis membrane are spaced from each other and form a second concentrated water-outlet, a first end of the second water division band and the end, away from the central tube, of the reverse osmosis membrane are spaced from each other and form a first raw water-inlet, and a second end of the second water division band and a second end of the central tube are spaced from each other and form a second raw water-inlet, wherein an external hole perimeter of the first concentrated water-outlet accounts for 10%-50% of a length of a longer side of the reverse osmosis membrane, and an external hole perimeter of the first raw water-inlet accounts for 10%-50% of the length of the longer side of the reverse osmosis membrane, such that flow dead spaces of the raw water are prevented.

10. The reverse osmosis membrane assembly according to claim 9, wherein the first concentrated water-outlet, the second concentrated water-outlet, the first raw water-inlet, and the second raw water-inlet are communicated with a raw water flow channel.

* * * * *